United States Patent [19]

Jacquish

[11] Patent Number: 4,869,734
[45] Date of Patent: Sep. 26, 1989

[54] AIR CLEANING SYSTEM

[75] Inventor: William W. Jacquish, Schaumberg, Ill.

[73] Assignee: Tri-Dim Filter Corporation, Chicago, Ill.

[21] Appl. No.: 289,530

[22] Filed: Dec. 27, 1988

Related U.S. Application Data

[63] Continuation of Ser. No. 159,506, Feb. 17, 1988, abandoned, which is a continuation of Ser. No. 20,030, Feb. 27, 1987, abandoned, which is a continuation-in-part of Ser. No. 835,366, Mar. 3, 1986, abandoned.

[51] Int. Cl.$^4$ .............................................. B01D 53/06
[52] U.S. Cl. ................................................... 55/60; 55/79; 55/99; 55/181; 55/208; 55/390; 55/474; 219/10.51; 219/10.65
[58] Field of Search .................... 34/169, 176, 177; 55/34, 60, 61, 77, 79, 99, 179–181, 208, 390, 474; 219/10.51, 10.57, 10.65, 10.71, 10.81; 502/45, 48, 56

[56] References Cited

U.S. PATENT DOCUMENTS

| | | |
|---|---|---|
| 1,261,470 | 4/1918 | Backstrom ..................... 219/10.51 |
| 1,522,480 | 1/1925 | Allen ................................... 55/61 |
| 1,617,960 | 2/1927 | Müller ............................. 55/79 X |
| 1,632,457 | 6/1927 | Tenney et al. .................. 55/474 X |
| 1,669,012 | 5/1928 | Nordström ...................... 34/169 X |
| 1,714,245 | 5/1929 | Schaefer ....................... 219/10.57 X |
| 1,763,538 | 6/1930 | Randolph .......................... 34/177 |
| 1,798,307 | 3/1931 | Cooper ........................... 55/390 X |
| 1,863,803 | 6/1932 | Pantenburg ..................... 34/169 X |
| 2,483,623 | 10/1949 | Clayton ........................ 219/10.65 |
| 2,513,242 | 6/1950 | Inman ............................ 219/10.51 |
| 2,636,575 | 4/1953 | Watson ............................... 55/79 |
| 2,644,881 | 7/1953 | Schörg .......................... 219/10.51 |
| 2,691,830 | 10/1954 | Karnofsky ........................ 34/77 X |
| 2,992,065 | 7/1961 | Feustel et al. .................. 55/79 X |
| 3,177,631 | 4/1965 | Tamura ........................... 55/390 X |
| 3,252,273 | 5/1966 | Stephens ......................... 55/390 X |
| 3,501,897 | 3/1970 | Van Helden et al. ........... 55/179 X |
| 3,717,976 | 2/1973 | Gappa et al. ..................... 55/79 X |
| 4,004,885 | 1/1977 | Groenendaal et al. .......... 55/99 X |
| 4,017,278 | 4/1977 | Reese ............................... 55/99 X |
| 4,017,422 | 4/1977 | Gappa et al. ..................... 55/77 X |
| 4,058,374 | 11/1977 | Juntgen et al. ................... 55/79 X |
| 4,083,701 | 4/1978 | Noack .............................. 55/79 X |
| 4,147,523 | 4/1979 | Izumo ............................. 55/208 |
| 4,207,082 | 6/1980 | Okamoto et al. .................. 55/60 |
| 4,231,764 | 11/1980 | Mattia ............................. 55/60 X |
| 4,257,783 | 3/1981 | Gutjahr et al. ..................... 55/61 |
| 4,259,094 | 3/1981 | Nagai et al. ..................... 55/181 |
| 4,263,028 | 4/1981 | Ohlmeyer et al. ............... 55/390 |
| 4,292,054 | 9/1981 | Noack et al. ................... 55/390 X |
| 4,308,036 | 12/1981 | Zahedi et al. .................... 55/99 X |
| 4,351,650 | 9/1982 | Shinoda et al. ................ 55/390 X |
| 4,409,006 | 10/1983 | Mattia ............................. 55/60 X |
| 4,414,003 | 11/1983 | Blaudszun ..................... 55/208 X |
| 4,443,419 | 4/1984 | Carson ............................ 55/77 X |
| 4,471,191 | 9/1984 | Greis et al. .................... 219/10.51 |
| 4,784,836 | 11/1988 | Karlsson et al. ............... 55/181 X |

FOREIGN PATENT DOCUMENTS

| | | | |
|---|---|---|---|
| 839688 | 5/1952 | Fed. Rep. of Germany ... | 219/10.65 |
| 1196806 | 11/1959 | France ........................... | 219/10.65 |
| 1232659 | 10/1960 | France ........................... | 219/10.65 |
| 94620 | 7/1980 | Japan .............................. | 55/79 |
| 55-145519 | 11/1980 | Japan .............................. | 55/179 |
| 45744 | 4/1981 | Japan .............................. | 55/60 |

Primary Examiner—Robert Spitzer
Attorney, Agent, or Firm—Marshall, O'Toole, Gerstein, Murray & Bicknell

[57] ABSTRACT

The apparatus includes an adsorber housing, beds of carbon mounted in the housing, the beds extending in generally vertical planes, and ducts for moving carbon downwardly through the beds from the upper side to the lower side of the housing. Air ducts are provided for conducting solvent-laden air into the housing and laterally through the beds, and conducting cleaned air out of the housing. A desorber for removing the solvent from the carbon includes a duct for conducting solvent-laden carbon received from the adsorber, an induction heater for heating the solvent in the carbon to vaporization temperature, and gas ducts for moving an inert gas through the carbon and thereby sweeping the solvent vapor from the carbon. The desorber includes a heater which may also be used for activation or reactivation of carbon.

25 Claims, 5 Drawing Sheets

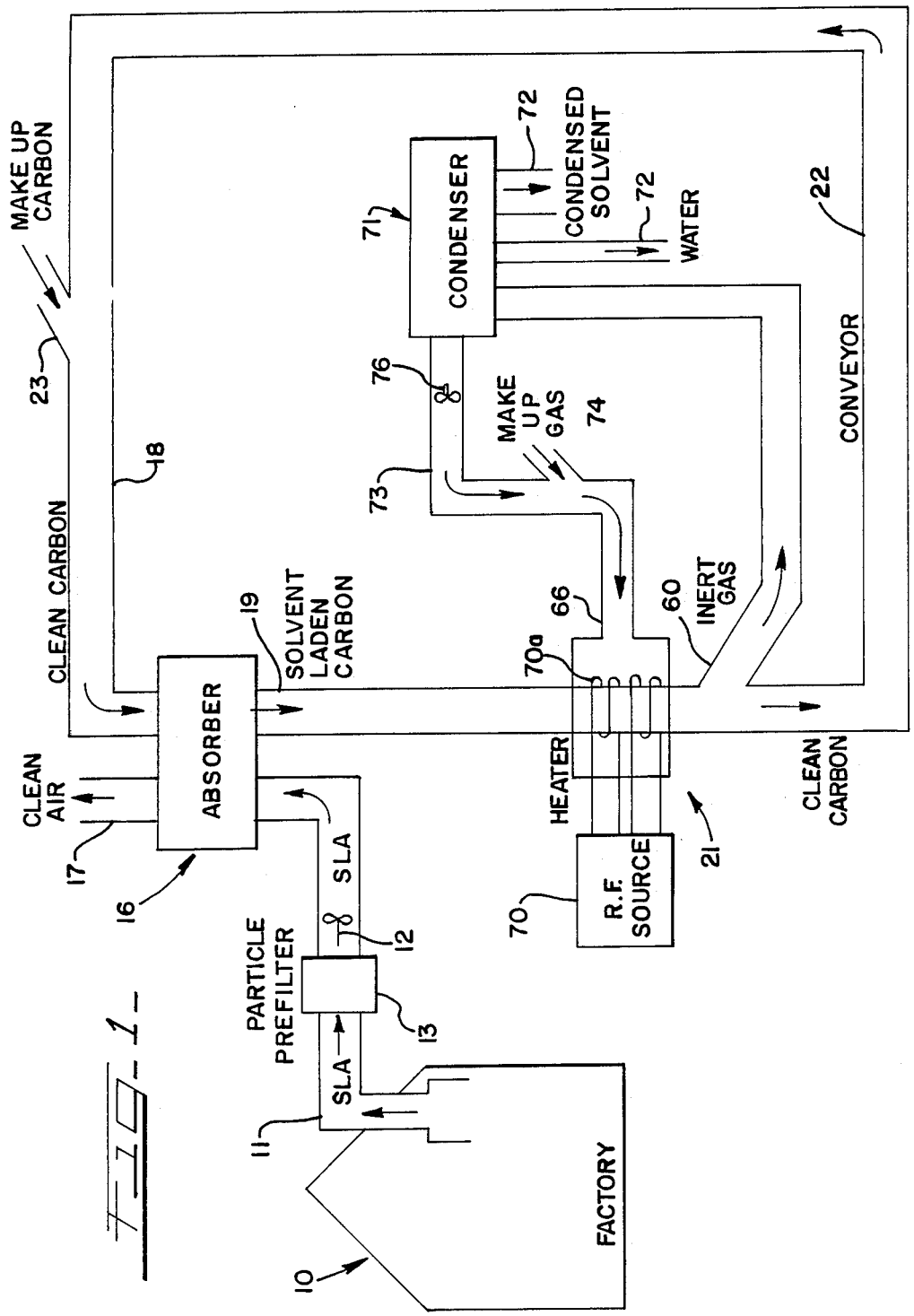

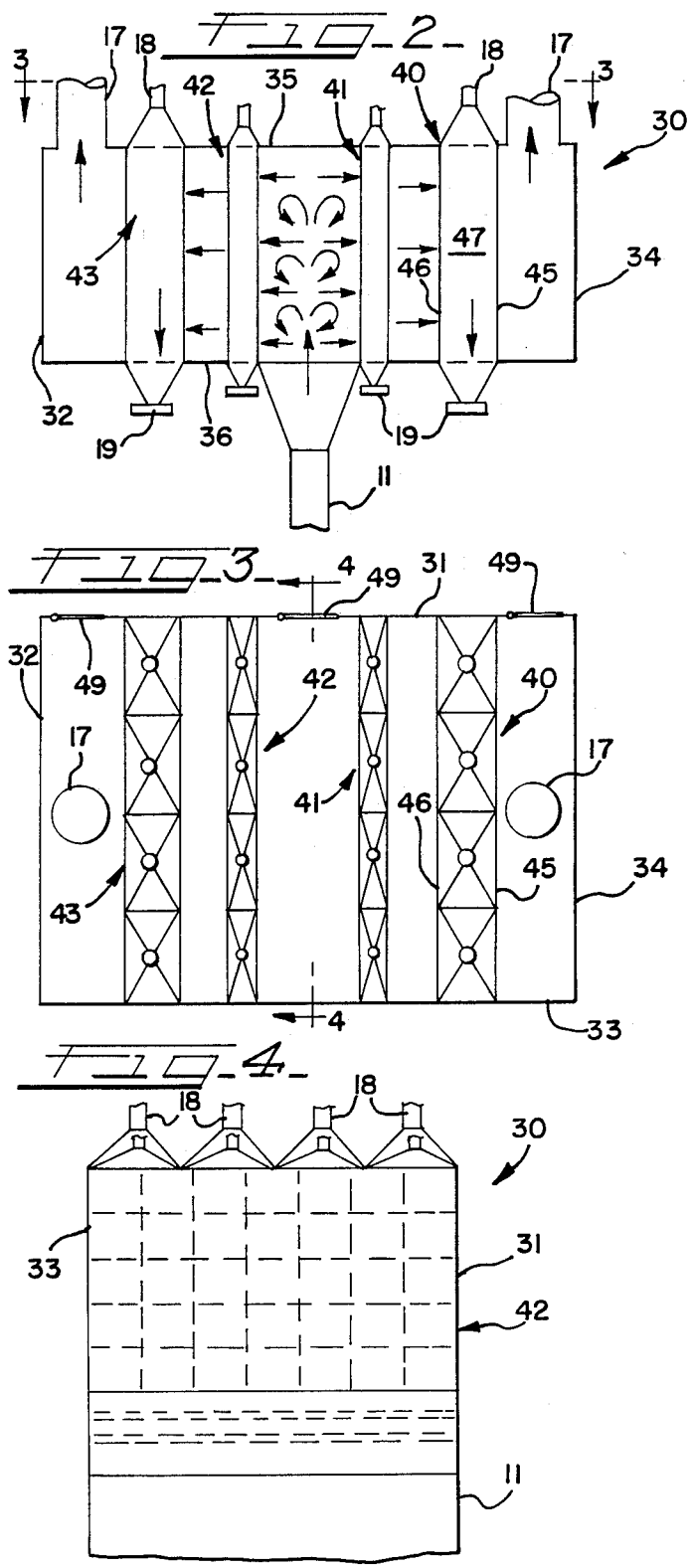

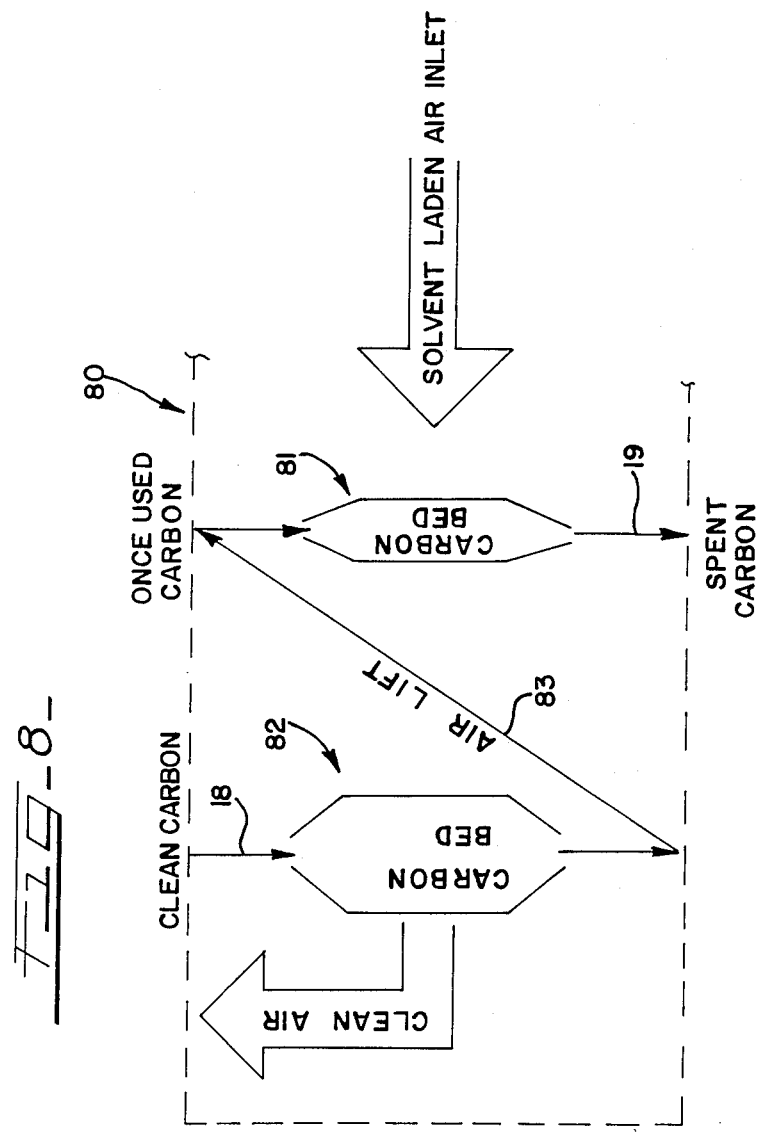

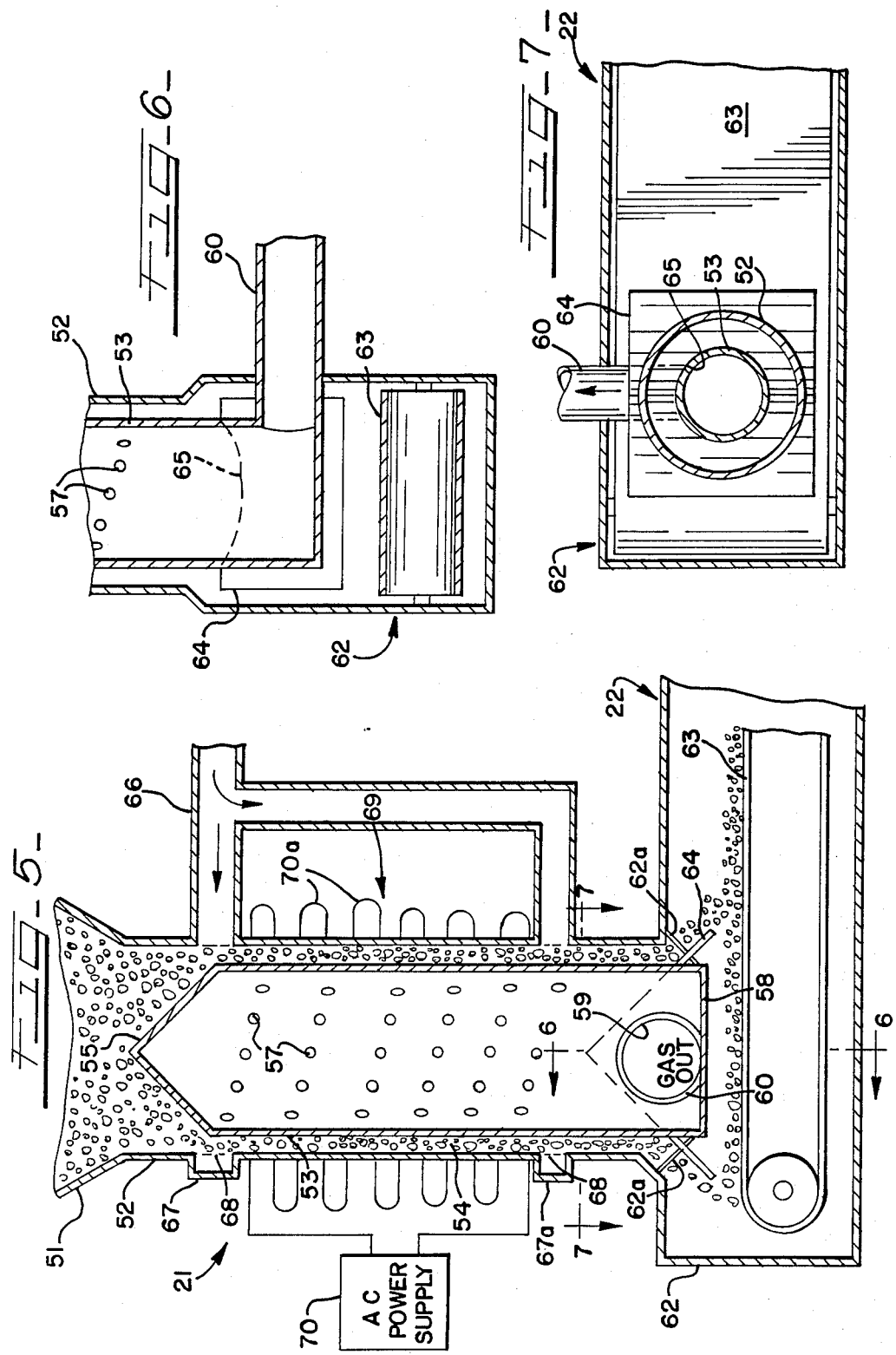

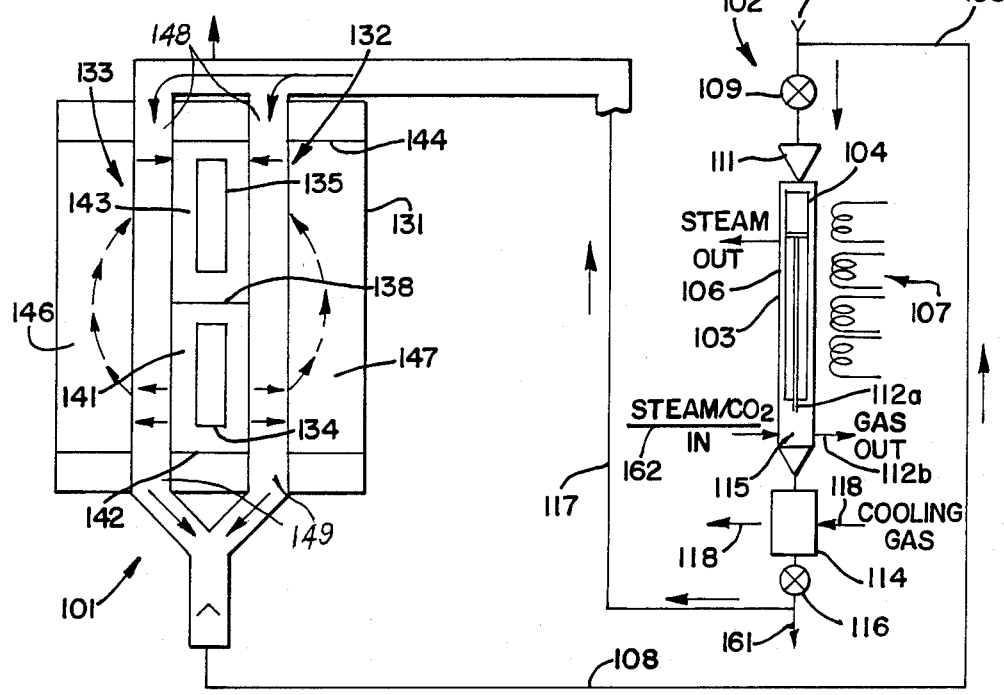
FIG_9_
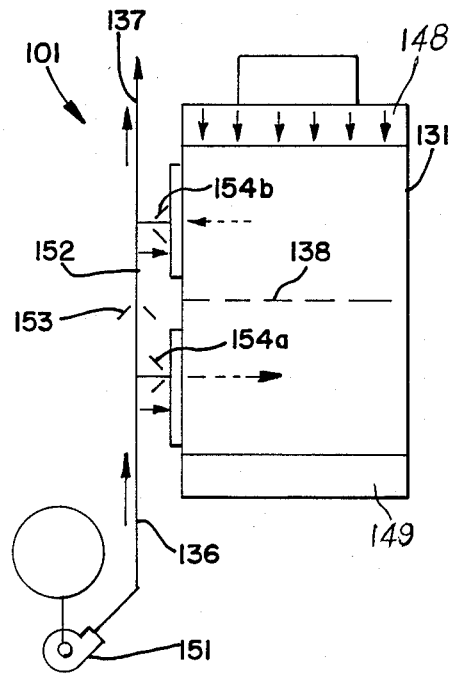
FIG_10_
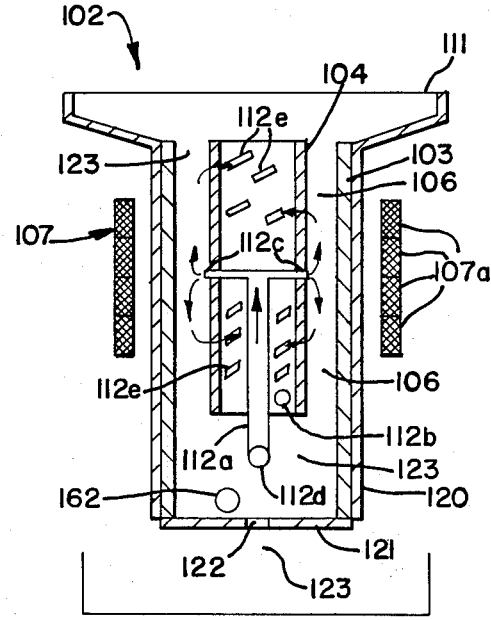
FIG_11_

4,869,734

AIR CLEANING SYSTEM

RELATED APPLICATIONS

This application is a continuation of application Ser. No. 07/159,506, filed Feb. 17, 1988, which is a continuation of application Ser. No. 07/020,030, filed Feb. 27, 1987, which is a continuation-in-part of application Ser. No. 07/835,366, filed Mar. 3, 1986, now all abandoned.

FIELD AND BACKGROUND OF THE INVENTION

This invention relates to an apparatus and a process for cleaning of air by removing solvents from the air.

In many industries there is a need for air cleaning equipment. An automobile manufacturing plant, for example, includes spray painting facilities, and there is a sizable amount of paint solvent contained in the air leaving the paint spray booths. EPA regulations require that the organic solvent be removed from the air before it is discharged into the atmosphere. In this situation, a high volume of air having a relatively low concentration of solvent must be processed.

Prior art systems have been provided for removing an organic solvent from an air stream, but, in general, such systems have been designed for the purpose of recovering solvent from air having a high concentration of solvent. Such systems have included, for example, a bed of carbon and ducts for feeding the air stream through the bed. The carbon adsorbs the solvent but passes the air, and when the carbon is saturated, the solvent is stripped or desorbed from the carbon. A common method of stripping the solvent is by steam heating the carbon, the heat serving to vaporize the solvent and thereby permit its removal. The carbon is then reused, and the solvent vapor is cooled to permit collection of liquid solvent. A system of this nature may include two carbon beds, one bed being stripped while the other adsorbs solvent.

Another system that has been used is one wherein an inert gas is heated and the hot gas is forced through a solvent-laden carbon. The gas both vaporizes the solvent and sweeps the vapor out of the carbon bed.

Prior art systems of the above character have been designed to handle relatively small volumes of air having relatively high concentrations of solvents. Such systems have also required relatively expensive and complex components, and they have been relatively inefficient because they operate by heating one medium and then using the heated medium to heat the carbon. Prior art systems also have the disadvantage that they have a relatively slow response to changes in the operating conditions, and their start-up time is relatively long.

It is a general object of this invention to provide an improved system for efficient processing of a high volume of air having a very low concentration of solvents.

SUMMARY OF THE INVENTION

Apparatus incorporating the invention includes an adsorber comprising a housing, at least two beds of carbon mounted in the housing, the beds extending in generally vertical planes, the carbon being arranged to move downwardly through the beds from the upper side to the lower side of the housing during operation, and air ducts for conducting solvent-laden air into the housing and laterally through the beds, and conducting cleaned air out of the housing.

Apparatus incorporating the invention further includes a carbon heater which may function as a desorber or as an activator/reactivator. When used as a desorber, it comprises a duct through which is moved solvent-laden carbon received from the adsorber. Induction heating means is coupled to the duct for heating the solvent in the carbon to vaporization temperature, and means is provided for moving an inert gas through the duct and thereby sweeping solvent vapor from the carbon. The duct that carries the carbon is in the shape of an annulus having a thickness which ensures that the carbon in the annulus is heated to the desired temperature. When used as an activator/deactivator, the carbon is heated to a very high temperature and steam is also moved through the carbon in the duct.

The invention also comprises a process for cleaning air and for cleaning carbon utilizing the foregoing adsorber and desorber.

BRIEF DESCRIPTION OF THE DRAWINGS

The invention will be better understood from the following detailed description taken in conjunction with the accompanying figures of the drawings wherein:

FIG. 1 is a schematic diagram showing a system incorporating the invention;

FIG. 2 is a sectional view of an adsorber in accordance with the invention;

FIG. 3 is a sectional view taken on the line 3—3 of FIG. 2;

FIG. 4 is a sectional view taken on the line 4—4 of FIG. 3;

FIG. 5 is a sectional view of a desorber in accordance with the invention;

FIG. 6 is a sectional view taken on the line 6—6 of FIG. 5;

FIG. 7 is a sectional view taken on the line 7—7 of FIG. 5;

FIG. 8 is a schematic diagram showing an alternative construction of the adsorber;

FIG. 9 is a diagram showing a system in accordance with a preferred embodiment of this invention;

FIG. 10 is a diagram further illustrating part of the system of FIG. 9; and

FIG. 11 is a diagram further illustrating another part of the system of FIG. 9.

DETAILED DESCRIPTION OF THE DRAWINGS

A system incorporating the invention is designed to clean air from, for example, a factory before exhausting the air into the atmosphere. The factory, illustrated schematically and indicated by the reference numeral 10 in FIG. 1, may, for example, include spray painting equipment and the air in the spray booths contains organic solvents. The solvent-laden air is collected in an exhaust duct 11 and moved through the duct 11 by an appropriate blower, indicated generally by the numeral 12. The solvent-laden air moves through the duct 11 and into the particulate filters 13 (which may have a conventional construction) for removing particles from the air, particularly particles of paint. After leaving the filters 13, the solvent-laden air is moved through an adsorber 16 (better shown in FIGS. 2, 3 and 4) where the solvent is removed from the air. Moisture normally contained in the air is also removed in the adsorber 16.

After having the solvent and moisture removed, the resulting clean air is exhausted into the atmosphere through an exhaust duct 17.

As will be described hereinafter, the air is cleaned or stripped of the solvent by moving the air through beds of carbon. The carbon is moved into the adsorber 16 through a clean carbon intake duct 18 and removed from the adsorber 16 through a duct 19 which carries solvent-laden carbon from the adsorber. After leaving the adsorber 16, the solvent-laden carbon is passed through a desorber 21 (better shown in FIGS. 5 to 7) which removes the solvent from the carbon. The clean carbon leaving the desorber 21 is carried through a clean-carbon return duct 22 by, for example, a conveyor and it is returned to the intake duct 18 of the adsorber 16. Thus, the carbon is continuously cycled through the adsorber 16 and the desorber 21. In the event of loss of a portion of the carbon during operation of the system, make-up carbon may be added at a carbon intake indicated generally by the numeral 23.

With specific reference to FIGS. 2, 3 and 4, the adsorber 16 includes a generally rectangular box-like housing 30 formed by side walls 31–34, a top wall 35 and a bottom wall 36. Mounted within the housing 30 and extending generally vertically between the top and bottom walls 35 and 36 and the side walls 31 and 33 are a plurality of carbon beds 40, 41, 42 and 43. Each of the beds 40–43 is formed by a pair of generally vertical screen meshes 45 and 46 which are laterally spaced in order to form a compartment for a layer of carbon 47. Above each of the beds 40–43 are formed openings in the top wall 35, and the intake duct 18 is branched and connected to the openings, and thereby feeds clean carbon through the top wall 35 and into the four beds 40–43. Similar openings are formed in the bottom wall 36 below the four beds, and the outlet duct 19 is branched and connected to the openings in the bottom wall 36. Thus, carbon enters the housing 30 by passing from the intake duct 18 and the carbon moves downwardly in the housing 30 between the mesh screens 45 and 46 of the four beds, and then the carbon moves out of the housing through the outlet duct 19 at the bottom of the housing 30.

As shown in FIGS. 2 and 3, the housing 30 is elongated in the horizontal direction and the air duct 11 for carrying the solvent-laden air is connected to the center part of the bottom wall 36 of the housing. The duct 11 extends substantially across the bottom wall 36 as best shown in FIG. 4, and the two innermost carbon beds 41 and 42 are located on opposite sides of the air intake duct 11. The two outermost beds 40 and 43 are located on the outsides of the beds 41 and 42, and the clean air exhaust ducts 17 are located in the top wall 35 on the outsides of the two beds 40 and 43. It will be apparent from FIGS. 2 and 3 that solvent-laden air entering the housing 30 through the duct 11 will enter the central part of the housing and will then move laterally outwardly in both directions and will pass first through the two beds 41 and 42 and then through the two beds 40 and 43. The air is cleaned by moving through the two pairs of beds and the air then moves out of the housing through the duct 17.

As shown in the drawings, the two innermost beds 41 and 42 may be constructed with a shorter lateral thickness than the two outermost beds 40 and 43. The reason for making the inner beds thinner is to prevent loss of all of the carbon in the housing in the event the prefilter 13 should fail. In this event, the air entering the housing 30 will contain particles of paint and the two inner beds 41 and 42 will become clogged with the paint. The two outer beds 40 and 43 will be substantially free of the paint, however, and since the two inner beds 41 and 42 are thinner, only a relatively small portion of the total amount of carbon in the housing 30 will be lost due to contamination by the paint. In the example illustrated herein, the beds 41 and 42 have about one-half the thickness of the beds 40 and 43, whereby the two beds 41 and 42 hold approximately one-third of the total amount of carbon in the housing 30.

It is preferred that the sides of the beds 40–43 be made adjustable so that the thicknesses of the beds may be varied. With an adjustment as described, the beds may have the same thickness or some may be thinner than others.

The carbon in the system is preferably in the form of activated charcoal in pellet form. It is preferred that relatively hard, firm pellets be used so that relatively little carbon will be lost by conversion to dust. The housing 30 has a plurality of doors 49 formed in it so that an average sized serviceman may enter the housing 30 in order to service the beds if necessary. In the specific example shown in the drawings, the doors 49 are formed in the side wall 31 at locations where a serviceman can gain access to both sides of all of the four beds 40–43.

The carbon leaving the housing 30 from the four beds 40–43 is combined in a single duct 19 and moved through the desorber, or solvent stripper, 21, best shown in FIGS. 5 to 7. The duct 19 has its lower end connected to a hopper 51 that feeds the carbon into the upper end of an outer susceptor pipe 52. Concentrically mounted within the outer pipe 52 is a separator in the form of an inner susceptor pipe 53, and the two pipes 52 and 53 form a relatively narrow annulus 54 between them. A cone-shaped cap 55 is fastened to the upper end of the inner pipe 53, which guides the downwardly moving carbon into the annulus 54. The inner pipe 53 has a plurality of openings 57 formed through its wall, and in the present example the openings 57 are formed in a spiral line that extends around the pipe from its upper to its lower end. The lower end of the inner pipe 53 is closed by a bottom plate 58, and a hole 59 is formed in the lower end of the pipe 53 just above the plate 58. A laterally extending duct 60 (see FIGS. 6 and 7) is secured in the hole 59.

An enclosure 62 surrounds the lower end of the inner pipe 53 and is connected to the lower end of the outer pipe 52. Supports 62a are connected between the pipes to support the inner pipe 53. A conveyor 63 is mounted within the enclosure 62 below the pipes, and the carbon that has moved through the desorber 21 falls onto the conveyor 63 and is carried through the return duct 22. A skirt 64 having the shape of an inverted V has a centrally formed circular opening 65 which receives the inner pipe 53. As best shown in FIG. 5, the skirt 64 forms a tent-like structure that is oriented to cover the duct 60 and to direct the downwardly-moving carbon onto the conveyor 63.

With reference to FIG. 5, an inert gas intake duct 66 is connected to upper and lower manifold portions 67 and 67a of the outer pipe 52, and screens 68 cover the openings of the manifolds. An inert gas, such as nitrogen, under pressure flows from the intake duct 66 and into the manifolds 67 and 67a, through the thin layer of carbon in the annulus 54, through the holes 57 in the inner pipe 53, downwardly and out of the desorber through the gas outlet duct 60. The manifolds are constructed as conventional surge bins which purge the ducts of air and prevent air from entering the heater part of the desorber.

The desorber 21 further includes an induction heater 69 including an electrical power supply 70 and windings 70a that extend around the outer pipe 52. The heater preferably also includes a water cooler (not shown) for cooling the windings 70a. The outer pipe 52 is made of an electrically conductive material, such as stainless steel, or graphite having an abrasion resistant coating of a material such as titanium. The interior pipe 52 may also be made of a metal such as iron or titanium. The pipe 52 is heated to a high temperature by the alternating field established by the windings 70a. The heat from the outer pipe 52 in turn heats the carbon layer in the annulus 54 and the inner pipe 53. The insert or inner pipe 53 may be made of mild or stainless steel or graphite coated with an abrasion resistant material, or it may be made entirely of titanium which acts as a reflector of the heat. The induction heater 69 heats the electrically conductive susceptor or outer pipe 52 to a high temperature, and the pipe 52 in turn heats the carbon in the annulus 54 by conduction, radiation and convection. The inner pipe 53 is similarly heated by the outer pipe 52, and the pipe 53 is also heated to some extent by the induction heater 69. Thus the pipes 52 and 53 function to form the annulus 54, heat the carbon, and conduct the inert gas. As a consequence, the layer of carbon moving downwardly through the annulus 54 is heated to above the vaporization temperature of the solvent and the water moisture contained in the carbon. The solvent and the water vaporize and the vapor is swept by the inflowing inert gas through the holes 57 and out of the desorber, thereby cleaning and drying the carbon. The inert gas in the annulus 54 and the inner pipe 53 also serve to prevent air from reaching the hot solvent vapor and causing an explosion.

The mixture of inert gas, solvent vapor and water vapor in the lateral duct 60 is connected to the intake of a condenser 71 (FIG. 1) which may be a conventional water-cooled condenser. The mixture is cooled to below the condensation points of the solvent and water vapors, causing the vapors to condense into liquids which are removed from the condenser 71 through outlets 72. The inert gas which is free of the solvent and is dry is exhausted from the condenser 71 through a return duct 73 which is connected to the duct 66, and the gas is recycled through the heater. In the event gas is lost in the system during operation, make-up gas may be fed into the system through a branch 74. A blower 76 is provided for forcing the gas to flow through the ducts as described.

It will be apparent from the foregoing that a novel and useful system has been provided. The beds in the adsorber are relatively large and their widths and thicknesses may be designed as desired, and are capable of cleaning a large volume of air having a relatively low concentration of solvent; further, the housing of the adsorber is large enough for a serviceman to enter and service the carbon beds. As a specific example, the housing 30 may be about eight feet high, about fourteen feet wide, and about 20 feet long. The carbon beds have nearly corresponding height and width dimensions (less a support frame for the screens 45 and 46), each of the beds 41 and 42 has a thickness of 1 foot and each of the beds 40 and 43 has a thickness of two feet. The rate of flow of the carbon through the beds is approximately one foot/hour, and approximately 2,580 pounds/hour of carbon may be moved through the four beds. In such an adsorber, the air velocity through the carbon may be about two feet/second.

The carbon may be extruded or spherical pellets of activated charcoal as previously mentioned, the pellets having dimensions between 1 and 4 mm for example. It is preferred that there be a gravity feed of the pellets through the bed, but if necessary a conventional pneumatic pressure feed arrangement may be provided to push the pellets through the beds and through the desorber 21.

Regarding the desorber 21, as a specific example, the pipes 52 and 53 may be approximately 15 feet long; the outer pipe 52 may have an inner diameter of about 10.5 inches and the inner pipe 53 may have an outer diameter of about 9.5 inches, thereby forming an annulus 54 having a width of ½ inch. It is essential that the annulus have a relatively narrow width, within the range of substantially ¼ inch to 1½ inches, and preferably substantially ½ inch. If the annulus is wider than the above range, the entire cross section of the carbon may not be heated to the necessary high temperature. If the annulus is narrower than this range, the diameter of the annulus would have to be excessively large to obtain a sizable flow rate capacity, and the carbon pellets could become jammed in the annulus. Each of the pipes 52 and 53 may have a wall thickness of 1 to 2 inches. The inner pipe 53 may be extruded in a cylindrical shape or it may be formed from a flat sheet which is formed into a cylinder and seam welded.

The holes 57 may be drilled or formed by a cutting torch, for example. The holes 57 may form about 1 to 2% of the surface area of the inner pipe, and the size of the holes is related to the size of the carbon pellets. If the holes are larger than the pellets, screens should be welded over the holes. Each hole may be about one to two square cent. in size and there may be about 150 holes, for example.

The inert gas is preferably nitrogen or argon and is provided at a pressure sufficiently high to prevent air from reaching the heated vapor.

The temperature to which the carbon is heated is determined by the power input to the induction coils, the width of the annulus, the rate of flow of the carbon through the annulus, and the amounts of solvent and moisture in the carbon.

As specific examples, the induction heater may have an operating frequency of 1,000 Hz. and an average power consumption of about 1,354 kw. With an annulus of approximately ½ inch and at a carbon flow rate through the desorber of about 11,200 lbs./hour, the carbon will be heated to about 1,100° F. At a flow rate of about 5,800 lbs./hour, the carbon will be heated to about 500° F. when using about 345 kw. Insulation may be placed around the pipes to reduce heat loss. The windings 70a preferably extend for the full 15 foot length of the pipes 52 and 53 so that the carbon is increasingly heated as it moves downwardly. The annulus should have a sufficient width that the carbon particles do not form bridges between the pipes and clog the annulus, and this width is therefore also a function of the size and shape of the carbon particles. A wider annulus, of course, results in reduced heating of the carbon.

The inert gas purges the vaporized solvent from the vapor. Since the carbon is directly heated, the vaporization of the solvent is rapid and efficient, as compared with systems wherein the carbon is heated by steam flowing through it or by a heated inert gas flowing through it. In the latter type of system wherein a heated inert gas vaporizes the solvent, it is necessary to pass a large quantity of gas through the carbon, which makes necessary a large condenser. In the present invention only a relatively small amount of gas and a relatively small condenser 71 are required.

The carbon leaving the desorber should be cooled before it is recycled to the adsorber; it is cooled while moving through the carbon return duct 22, and the inert gas also cools the carbon somewhat.

The various ducts and screens are preferably made of iron, stainless steel or titanium. The amount of inert gas should be about one and one-half times the weight of the solvent to be removed.

FIG. 8 illustrates an alternative arrangement for moving the carbon through the adsorber. The adsorber includes a housing 80, which is generally similar to the housing 30, and at least one pair of moving carbon beds 81 and 82. The bed 81 is relatively thin and has approximately one-half the thickness of the bed 82. The clean carbon intake 18 is connected to the top of the thicker bed 82 and the carbon outlet duct 19 is connected to the bottom of the bed 81. A conveyor 83, which may be an air lift, is connected to carry carbon from the lower end of the bed 82 to the upper end of the bed 81. The solvent laden air enters the housing from the right of the bed 81, flows first through the bed 81 and then through the bed 82, and the cleaned air leaves the housing from the left of the bed 82.

The solvent laden air first passes through the once-used carbon of the bed 81 and the once treated air, then flows through the clean carbon in the bed 82. In the event paint particles are in the air entering the housing 80, they will be confined to the thin bed 81, and the carbon from this bed is treated in the desorber at temperature high enough to vaporize and pyrolyse the particles.

While only one pair of carbon beds is shown in FIG. 8, it should be understood that a second pair may also be provided as shown in FIG. 2.

FIGS. 9, 10 and 11 illustrate a further and preferred embodiment of the present invention. FIG. 9 is a schematic diagram showing essentially an entire system which comprises an adsorber section 101 and a desorber section 102. With reference first to the desorber section 102 (FIGS. 9 and 11), it comprises an outer pipe 103 and an insert or tubular interior pipe 104, the insert 104 being concentrically arranged within the outer pipe 103 and spaced therefrom in order to form a duct or annulus 106, similar to the arrangement shown in FIG. 5. An induction heater including an induction coil 107 (which may be formed in a plurality of coil sections 107a) is arranged around the two pipes 104 and 103, and the coil heats the carbon flowing through the annulus 106 as previously described. Solvent-laden carbon is passed through a conduit 108 (FIG. 9) to the upper end of the pipe 103, the carbon passing through a valve 109 which forms an air lock, and through a guide channel or funnel 111 before passing into the annulus 106. Conduits 112a and 112b for an inert gas such as argon, nitrogen, etc., are connected to the inner and outer pipes in order to flow the inert gas into and out of the heated carbon and draw the solvent and moisture vapor out of the carbon.

At the lower or discharge end of the annulus between the inner and outer pipes, the cleaned carbon is passed through a zero pressure zone 115 and a carbon cooler 114 (FIG. 9) and through another rotary valve 116 or air lock before passing to a conduit 117. Connected to the cooler 114 are conduits 118 for a cooling medium such as an inert gas. The carbon cooler may have a conventional construction and is not, by itself, part of the present invention.

The size of the annulus 106 is again within the range of ¼ inch to 1½ inches in width, and it is preferably substantially one-half inch in width. The outer pipe 103 may be made of stainless steel and the inner pipe 104 made of mild steel, for example, these materials being electrically conductive and heated by the fluctuating field established by the induction heater coil 107. For the desorbing function, the temperature of the carbon is normally raised to approximately between 280° F. to 1,200° F., depending upon the type of solvent. At the higher temperatures, residual combustible particles in the carbon will be pyrolysed.

The arrangement of the desorber is shown better in FIG. 11. A heat insulating layer 120 (such as ceramic fiber paper) which will not interfere with the electric field set up by the inductor coil 107, may be placed around the outer surface of the outer pipe 103 in order to reduce heat loss. At the lower end of the outer pipe 103 is fastened a flow control device 121 which in this instance comprises a plate having a variable size opening 122 formed in it. By varying the size of the opening 122, the rate of flow of the carbon through the annulus 106 may be controlled. A plurality of heat sensors 123 may be provided at various locations in the desorber in order to sense the temperature of the carbon at these locations, these temperature readings being utilized to regulate the rate of flow of the carbon. In this example, a sensor 123 is located by the opening 122, another at the lower end of the interior pipe 104, and another at the entrance ends of the two pipes 103 and 104. For example, if the sensors at the discharge end of the desorber indicate that the temperature of the carbon is too low, the power to the induction heater may be increased or the flow control opening 122 may be closed slightly in order to slow the rate of flow of the carbon, and thereby increase the temperature of the carbon to the desired level which is required to completely or essentially completely remove the solvent from the carbon. The use of the different coil sections 107a allows for controlled zone heating because the coils may have different energy levels.

The inert gas conduits 112 may be connected in various configurations. In FIGS. 9 and 11, the gas intake conduit 112a extends through the interior of the inner pipe 104. One end of the conduit 112 is connected to a plurality of nozzles 112c which extend through the wall of the inner pipe 104, and the other end of the conduit 112a is connected to an intake pipe 112d. A plurality of openings 112e are formed in the inner pipe 104, and the gas outlet conduit 112b is connected to the interior of the inner pipe 104. Thus, gas under pressure flows into the heater through the conduits 112d and 112a, through the nozzles 112c and the carbon in the annulus 106, into the interior of the inner pipe 104 through the openings 112e, and out of the heater through the conduit 112b. Of course, still other arrangements are possible for flowing the inert gas through the carbon. In this installation, the lower end of the inner pipe 104 is spaced from the plate 121 so that carbon may accumulate in this space, and this area forms a low pressure zone.

With reference next to the adsorber section 101, it comprises a generally rectangular housing 131 (FIGS. 9 and 10) which has one or more vertically extending carbon beds arranged in it. In the present instance, two vertical carbon beds 132 and 133 are provided. The two beds 132 and 133 are arranged on opposite sides of inlet and outlet openings 134 and 135 which are connected to ducts 136 and 137 for conveying air. An intermediate baffle or plate 138 is mounted within the interior of the housing 131 and between the two beds 132 and 133, and the plate 138 separates the two openings 134 and 135. An inlet plenum or chamber 141 is formed between the two beds 132 and 133 and the floor 142 of the housing and the intermediate plate 138, the plenum 141 being in flow communication with the inlet opening 134. Similarly, an outlet plenum or chamber 143 is formed above the plate 138 and between the beds 132 and 133 and an upper wall 144 of the housing. Further, intermediate plenums or chambers 146 and 147 are formed within the housing 141 on the outer sides of the two beds 132 and 133.

The air conduit 136 (see FIG. 10) is connected to receive solvent-laden air from a blower 151, the blower 151 serving to remove the solvent-laden air from, for example, a spray paint booth in a factory. The solvent-laden air moves through the duct 136 and through the inlet opening 134 and into the plenum 141. The solvent-laden air then flows through the lower sections of the two carbon beds 132 and 133 and into the intermediate plenums 146 and 147. The air then flows upwardly and again passes through the upper sections of the two beds 132 and 133 and flows into the upper or exhaust plenum 143. The air at this time has been stripped of the solvent by flowing through the two beds 132 and 133 and the clean air then flows out of the exhaust opening 135 and into the clean air duct 137.

The carbon beds are preferably also provided with blank extensions 148 and 149 at their upper and lower ends to prevent air from bypassing the beds. While FIGS. 9 and 10 show an arrangement where each air stream from the inlet 134 crosses each bed twice, first in one direction and then in the other, it should be understood that the beds could have an increased height and additional baffles 138 and plenums provided so that each air stream may crisscross each bed a number of times in a serpentine fashion, to enhance the air cleaning function.

With reference again to FIG. 10, a shunt or branch 152 air duct is preferably connected between the two ducts 136 and 137 and across the openings 134 and 135. A damper 153 is mounted in the branch 152, and dampers 154a and 154b are mounted in front of the openings 134 and 135. When the air flowing through the duct 136 is laden with solvent, the damper 153 is closed and the dampers 154a and 154b are opened, which causes the air to flow through the desorber 101. On the other hand, when the air flowing through the duct 136 is clean (for example during the night when the spray paint booths are not being used) the damper 153 may be opened and the dampers 154a and 154b closed so that the clean air flows directly to the duct 137 and bypasses the desorber.

With reference again to FIG. 9, the duct 117 carrying the cleaned carbon from the desorber 102 is connected to the upper end of the adsorber 101 and feeds the clean carbon into the upper ends of the two vertical beds 132 and 133. The carbon preferably is moved through the two beds 132 and 133 by gravity, and at the lower end of the adsorber 101, the carbon flowing from the two beds is merged and fed to a duct 108 where it is returned to the upper end of the desorber 102.

The arrangement or system illustrated in FIGS. 9, 10 and 11 is advantageous in that the adsorber forms a simplified arrangement for removing the solvent from the air by passing the air two (or more) times through lower and upper sections of the two carbon beds 132 and 133. The air in the lower plenum 141 is heavily laden with solvent and this air flows through the lower sections of the beds which sections already contain some solvent. The air flowing from the intermediate plenums 146 and 147 is already partially cleaned and this air is completely cleaned by flowing through the clean carbon in the upper sections of the two beds. The desorber illustrated in FIGS. 9 and 11 is advantageous in that it enables a greater control of the temperature of the carbon flowing through the annulus 106. The opening 122 may be adjusted as well as the rotary valves 109 and 116 to control the rate of flow of the carbon through the annulus in accordance with the desired temperatures at the various locations of the temperature sensors 123.

While the carbon heating section 102 has been described as a desorber for removing solvents from carbon, the section 102 may also be used as a carbon activator or reactivator. In this type of operation, the ducts 108 and 117 are not coupled to the heater 102, and carbon to be activated or reactivated is introduced to and removed from the heater at the locations 160 and 161.

To activate carbon, virgin carbon is fed to the heater at the location 160 and it flows to the annulus 106. The induction coils 107 are energized to heat the carbon to the high activation temperature. Depending on the type of carbon to be activated, a reaction gas such as either steam or carbon dioxide ($CO_2$) may be fed into the heater through an intake duct 162. The steam/$CO_2$ flows through the heated carbon and into the openings 112e of the inner pipe 104 (the lower and upper ends of the pipe are closed), and out of the heater through the outlet 112b. Inert gas may simultaneously be injected in the manner previously described, and in this instance all of the gases mix and exit through the conduit 102b. If $CO_2$ is used, the temperature of the carbon should be raised to a reaction temperature of approximately 1,550° F.; if steam is used the temperature of the carbon should be raised to the reaction temperature of approximately 1,800° F. When the temperatures are expected to rise to these high values, the inner and outer pipes should be made of a metal which will withstand them. For example, a metal such as Haines 214 may be used.

In the instance where carbon is to be reactivated, the carbon has been previously activated, used and substantially desorbed. The reactivation process removes any remaining solvent or other material and reactivates the carbon. Inert gas should be flowed through the carbon to remove the remaining solvent or other material, and either steam or $CO_2$ is also flowed through the carbon. The temperature levels are as described in the preceding paragraph.

In the various embodiments of the invention, the gas or gases (inert gas, steam or $CO_2$) fed into the heater should be preheated to reaction temperature before it contacts the carbon. By the reaction temperature it is meant the various temperatures set out herein at which the solvent is vaporized or pyrolysed, or the carbon is activated or reactivated. A conventional gas heater may be utilized to preheat the gas.

An induction heating arrangement as described herein is advantageous as compared with an ordinary resistance electric heater because it provides much faster control and a short response time. The outer pipe or susceptor as well as the insert may be formed of a relatively thin material so that it stores a relatively limited amount of heat (for example only about 5,000 watts) which is considerably less than would be necessary if a resistance heater were used. As a consequence, the temperature of the outer pipe may be changed much more quickly than the temperature of a resistance heater, thereby providing much faster response to a change in the temperature of the carbon and also enabling a desorber to be brought from a cold start to a high temperature very quickly. The advantages of a fast response and an accurate control of the temperature is highly advantageous in this type of system because of the variance in the amount of solvent and moisture contained in the carbon.

The provision of the annulus for carrying the carbon through the induction heater is also very important. The carbon must be closely adjacent the outer pipe or susceptor 103 in order to be heated to a very high temperature, and this is assured by the relatively narrow width of the annulus. The quantity or mass of carbon flowing through the desorber is controlled by the valves as previously explained to maintain the desired high temperature. The diameters of the outer and inner pipes 103 and 104 may be designed or controlled in diameter to enable the required mass of carbon to be moved through the desorber at the needed flow rate, while nevertheless maintaining the width of the annulus within the prescribed range of widths.

It should be understood that various modifications may be made which would still fall within the scope of the invention. For example, the induction coils might be mounted within the interior of the inner pipe or member and the interior pipe or member in this instance would be a primary heat source to the carbon. The pipes and the annulus need not be round in cross section, although this shape is preferred. They could instead be oval, rectangular, etc.

What is claimed is:

1. A process for removing solvent from air, comprising the steps of substantially continuously moving carbon pellets downwardly through generally vertical carbon beds, moving solvent-laden air laterally through said beds and thereby removing the solvent from the air, the solvent collecting in said carbon, moving the solvent-laden carbon out of said beds and through an annular heater duct, heating the carbon and the solvent in said annular heater duct by induction heating to above the vaporization temperature of the solvent, and forcing an inert gas through said annular heater duct and thereby removing the vaporized solvent from the carbon while moving through said annular heater duct.

2. A process as in claim 1, wherein the inert gas is moved across the direction of movement of the carbon.

3. A process as in claim 1, and further comprising the step of returning the carbon from said heater duct to said beds.

4. A process as in claim 1, and further including the steps of condensing the vaporized solvent in the gas, and returning the gas to said heater duct.

5. A system for removing solvent from air, comprising:
   (1) an adsorber comprising a housing, at least one generally vertical moving carbon bed section mounted in said housing, air ducts for conducting solvent-laden air to said housing and exhausting cleaned air from said housing, said ducts being arranged such that said air is moved through said carbon bed section;
   (2) a desorber including an electric induction heater, a carbon outlet duct connected to said housing and to said heater for moving carbon from said beds to said heater, said heater including pipe means forming an annular flow path, the carbon moving through said annular flow path and being heated by said induction heater while in said annular flow path to vaporize the solvent, means for moving an inert gas through the carbon in said annular flow path and for removing said vaporized solvent from the carbon while in said annular flow path; and
   (3) a return carbon duct connected to said heater pipe and to said housing for returning carbon from said heater pipe to said beds.

6. A system as in claim 5, wherein said housing of said adsorber has at least one door formed therein, and said housing is sufficiently large for an average size person to enter.

7. A system as in claim 5, wherein said adsorber includes four carbon bed sections arranged in generally parallel vertical planes and forming two innermost sections and two outermost sections, said air ducts including an intake air duct for carrying solvent-laden air into said housing between said two innermost sections and exhaust ducts formed in said housing on the outside of said outermost sections.

8. A system as in claim 5, wherein each of said bed sections is formed by generally parallel mesh screens and charcoal pellets between said screens.

9. A system as in claim 5, wherein said adsorber comprises an upper bed section and a lower bed section, said lower bed section being located below and having a flow connection with said upper bed section for receiving carbon from said upper bed section, and said air ducts conducting air first through said lower bed section and then through said upper bed section.

10. A system as in claim 5, wherein said annular flow path is in the range of substantially ¼ inch to 1½ inches in width.

11. A system as in claim 10, wherein said annular flow path is substantially ½ inch in width.

12. A system as in claim 5, wherein said heater of said desorber comprises a plurality of electric induction heater coils around said heater pipe.

13. A system as in claim 5, and further including a condenser connected to said gas moving means, said condenser being operable to remove solvent from said gas, and means for returning said gas from said condenser to said gas moving means.

14. A heater for carbon, comprising an outer pipe adapted to receive carbon particles, interior means within said outer pipe, said interior means forming a gas flow path, said outer pipe and said interior means forming a carbon flow path therebetween, said interior means having a plurality of gas flow openings formed therein, said openings forming a gas flow communication between said carbon flow path and said gas flow and an induction heater adjacent one of said outer pipe and said interior means, said induction heater comprising at least one electric induction heater coil and an alternating current power supply connected to said coil, said one of said outer pipe and said interior means being a susceptor and formed of a material which is heated by induction heating.

15. A heater as in claim 14, wherein said interior means comprises an inner pipe mounted within said outer pipe, said inner and outer pipe forming an annular carbon flow path therebetween.

16. A heater as in claim 14, wherein said induction heater is mounted around the outside of said outer pipe.

17. A heater as in claim 14, wherein said outer pipe and said interior means are spaced to form a carbon flow path having a width in the range of substantially $\frac{1}{4}$ inch to substantially $1\frac{1}{2}$ inches.

18. A heater as in claim 17, wherein said carbon flow path has a width of substantially $\frac{1}{2}$ inch.

19. A heater as in claim 14, wherein said outer pipe, said interior means and said flow path are substantially circular in cross section.

20. A heater as in claim 14, wherein said heater coil comprises a plurality of coil sections.

21. A heater as in claim 14, and further comprising control means connected in said carbon flow path for controlling the quantity of carbon flowing through said flow path.

22. A heater as in claim 14, and further including means for flowing a gas through said carbon flow path and through said flow openings.

23. A heater as in claim 22, and further including a condenser connected to said gas flowing means, said condenser being operable to remove a solvent from said gas, and means for returning said gas from said condenser to said gas flowing means.

24. A heater as in claim 22, wherein said gas flowing means is arranged to move the gas across said carbon flow path.

25. A heater as in claim 14, wherein said interior means is made of metal and forms a heat reflector.

* * * * *